United States Patent
Eriksson et al.

(10) Patent No.: US 9,532,373 B2
(45) Date of Patent: Dec. 27, 2016

(54) COLLISION RESOLUTION FOR PUCCH SCHEDULING REQUESTS

(75) Inventors: Erik Eriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 14/239,341

(22) PCT Filed: Oct. 7, 2011

(86) PCT No.: PCT/SE2011/051206
§ 371 (c)(1),
(2), (4) Date: Feb. 18, 2014

(87) PCT Pub. No.: WO2013/028113
PCT Pub. Date: Feb. 28, 2013

(65) Prior Publication Data
US 2014/0192763 A1    Jul. 10, 2014

Related U.S. Application Data

(60) Provisional application No. 61/526,142, filed on Aug. 22, 2011.

(51) Int. Cl.
*H04W 72/12* (2009.01)
*H04W 74/08* (2009.01)

(52) U.S. Cl.
CPC ....... *H04W 72/1284* (2013.01); *H04W 74/085* (2013.01)

(58) Field of Classification Search
None
See application file for complete search history.

(56) References Cited

U.S. PATENT DOCUMENTS

2008/0267165 A1* 10/2008 Bertrand ............ H04J 3/06
370/350
2009/0103558 A1    4/2009 Zangi et al.
(Continued)

FOREIGN PATENT DOCUMENTS

| WO | 2011025426 A1 | 3/2011 |
| WO | 2011050839 A1 | 5/2011 |
| WO | 2011129582 A2 | 10/2011 |

OTHER PUBLICATIONS

Ericsson et al: "SR Prohibit Timer", 3GPP Draft; R2-095795 (REL-9 SR Prohibit Timer), 3rd Generation Partnership Project (3GPP), Mobile Competence Centre ; 650, Route Des Lucioles ; F-06921 Sophia-Antipolis Cedex ; France, No. Miyazaki; 20091012, Oct. 12, 2009 (Oct. 12, 2009), XP050390283, [retrieved on Oct. 6, 2009] consisting of 9-pages.
(Continued)

*Primary Examiner* — Wei Zhao
*Assistant Examiner* — Ronald h Davis
(74) *Attorney, Agent, or Firm* — Christopher & Welsberg, P.A.

(57) ABSTRACT

Collision mitigation for scheduling requests, SRs, on the physical uplink control channel, PUCCH, in Long Term Evolution, LTE, radiocommunication systems is described. Various types of SR collision mitigation information can be transmitted from a base station eNodeB (32) to a user equipment, UE(36). The UE can use the collision mitigation information to determine how to transmit its SRs. The network or base station (32) can use its knowledge of the SR collision mitigation information sent to various UEs (36) (and/or additional information) to resolve SR collisions on the uplink.

36 Claims, 9 Drawing Sheets

(56) References Cited

U.S. PATENT DOCUMENTS

| | | | | |
|---|---|---|---|---|
| 2009/0109908 A1* | 4/2009 | Bertrand | ............... | H04L 5/0051 370/329 |
| 2009/0175159 A1* | 7/2009 | Bertrand | ........... | H04W 72/0406 370/203 |
| 2009/0239568 A1* | 9/2009 | Bertrand | ........... | H04W 52/0225 455/522 |
| 2010/0002664 A1* | 1/2010 | Pan | ........................ | F03B 13/00 370/338 |
| 2010/0279695 A1* | 11/2010 | Amirijoo | .......... | H04W 36/0055 455/438 |
| 2011/0141928 A1* | 6/2011 | Shin | ..................... | H04L 1/0028 370/252 |
| 2011/0171985 A1* | 7/2011 | Papasakellariou | .... | H04W 72/02 455/509 |
| 2011/0188422 A1* | 8/2011 | Ostergaard | ........ | H04W 72/1284 370/311 |
| 2011/0205981 A1* | 8/2011 | Koo | ..................... | H04L 1/1671 370/329 |
| 2011/0211546 A1* | 9/2011 | Hooli | .................... | H04L 1/1671 370/329 |
| 2011/0216713 A1* | 9/2011 | Kim | ...................... | H04L 5/0053 370/329 |
| 2011/0321050 A1* | 12/2011 | Ho | ......................... | H04W 4/08 718/102 |
| 2012/0120817 A1* | 5/2012 | Khoshnevis | .......... | H04L 1/0026 370/252 |
| 2012/0213187 A1* | 8/2012 | Yang | .................... | H04L 1/0027 370/329 |

OTHER PUBLICATIONS

International Search Report and Written Opinion dated Feb. 3, 2014 for International Application Serial No. PCT/SE2011/051206, International Filing Date: Oct. 7, 2011 consisting of 13-pages.

European First Examination Report dated Feb. 4, 2016 for European Regional Phase Application Serial No. 11 802 555.0-1857, European Regional Phase Entry Date: Mar. 13, 2014 consisting of 5-pages.

* cited by examiner

COLLISION RESOLUTION FOR PUCCH SCHEDULING REQUESTS

TECHNICAL FIELD

The present invention relates generally to telecommunications systems, and in particular, to methods, systems, devices and software for collision resolution for uplink scheduling requests, e.g., on the PUCCH.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}$=1 ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station (typically referred to as an eNB in LTE) transmits control information indicating to which terminals and on which resource blocks the data is transmitted during the current downlink subframe. This control signalling is typically transmitted in the first 1, 2, 3 or 4 OFDM symbols in each subframe. A downlink system with 3 OFDM symbols as the control region is illustrated in FIG. 3.

On the LTE uplink, single-carrier frequency division multiple access (SC-FDMA) is used in a manner wherein, as much as possible, the structure is aligned as much as possible with the LTE downlink. Thus, as shown in FIG. 4(a), the uplink subcarrier spacing in the frequency domain is also 15 kHz and resource blocks having 12 subcarriers are also defined for the LTE uplink. An example of the LTE uplink subframe and slot structure is shown as FIG. 4(b). Therein, it can be seen that one subframe includes two equally sized slots, each slot having six or seven SC-FDMA blocks (normal and extended cyclic prefix, respectively). An example of LTE uplink resource allocation is provided in FIG. 4(c), wherein the assigned uplink resource for a user corresponds to the same set of subcarriers in the two slots.

The 3GPP LTE radio access standard has been written in order to support high bitrates and low latency both for uplink and downlink traffic. All data transmission is in LTE controlled by the radio base station. In order to support efficient uplink scheduling, a method has been defined to inform the base station of the buffer status of the UE. This method mainly consists of buffer status reports (BSR) and scheduling requests (SR). A number of rules have been defined regarding when a UE should trigger a BSR, such as arrival of new data to an empty buffer. The BSR is sent on the physical uplink shared channel (PUCCH) like other data transmissions.

A BSR transmission therefore requires a valid uplink resource. SR has been defined as single bit information indicating to the base station that a BSR has been triggered in the UE. The SR can be transmitted either on a preconfigured semi-static configured periodic resource on the physical uplink control channel (PUCCH), referred to as D-SR, or if no such resource has been configured, on the Random Access Channel (RACH), referred to as RA-SR. The D-SR resource on the PUCCH uses a code division multiple access scheme to uniquely identify the user on a specific time/frequency resource.

On each LTE uplink resource block pair dedicated for PUCCH, up to 36 unique code resources is available. A resource block pair is a time-frequency resource consisting of two in time consecutive resource blocks made up from one slot (0.5 ms) in time and 180 kHz in frequency. Two slots make up a transmission time instance (TTI). It is up to the LTE base station, i.e., an eNodeB, to divide the resources in time, frequency and code, where the trade-off stands between short periodicities giving low latency but costing in larger overhead for control channels versus lower overhead but with longer delay.

Thus, as described above, in LTE there is a semi-static configuration of SR resources and no SR collisions since the SR resources are not reused. For an active session the static configuration can limit the latency and the available bandwidth of the user. A remedy would be to configure a shorter SR periodicity, but this would limit the number of users that could be present in the system. Consider, as a purely illustrative example, that a system was configured to use 2 resource blocks for SR and that the UEs has a 1 ms SR periodicity, this would limit the system to 72 UEs with a SR resource.

The reason for the limit in latency is the corresponding waiting periods for requesting UL resources. The need for uplink resources can be either that the UE wishes to send data, but it can also be feedback to higher layers. One scenario where faster feedback is important is TCP-slow-start. This a mechanism to sense the bandwidth to user by slowly raising the transmission bandwidth, while waiting for confirmation. The faster the UE can give feedback, the faster the transmission will rise. The extra latency on feedback can also be interpreted by higher layers as a limit in downlink bandwidth. This can lead to throttling of the downlink throughput, even if the LTE system could support higher bandwidth.

Accordingly, it would be desirable to provide a mechanism to reuse resources for transmitting SRs, while also being able to identify users and resolve SR collisions, e.g., on the PUCCH in an LTE system.

SUMMARY

A method for transmitting a scheduling request (SR) on a physical uplink control channel (PUCCH) comprising:
  receiving, by a user equipment, SR collision mitigation information; and
  transmitting an SR signal on said PUCCH using a transmission resource which is selected based on the SR collision mitigation information.

The SR collision mitigation information can indicate (a) a resource pattern assigned to the UE, (b) a signal pattern assigned to the UE, or (c) a prohibition time assigned to the UE. The SR collision mitigation information can indicate (a) a resource to pattern assigned to the UE and (b) a signal pattern assigned to the UE. The SR collision mitigation information can indicate (a) a resource pattern assigned to the UE, (b) a signal pattern assigned to the UE, and (c) a prohibition time assigned to the UE. The SR collision mitigation information can indicate (a) a resource pattern assigned to the UE and (c) a prohibition time assigned to the UE. The SR collision mitigation information can indicate (b) a signal pattern assigned to the UE, and (c) a prohibition time assigned to the UE.

A user equipment (UE) comprising:
  a transceiver configured to receive SR collision mitigation information, and
  further configured to transmit an SR signal on a PUCCH using a transmission resource which is selected based on the SR collision mitigation information.

The SR collision mitigation information can indicate (a) a resource pattern assigned to the UE, (b) a signal pattern assigned to the UE, or (c) a prohibition time assigned to the UE. The SR collision mitigation information can indicate (a) a resource pattern assigned to the UE and (b) a signal pattern assigned to the UE. The SR collision mitigation information can indicate (a) a resource pattern assigned to the UE, (b) a signal pattern assigned to the UE, and (c) a prohibition time assigned to the UE. The SR collision mitigation information can indicate (a) a resource pattern assigned to the UE and (c) a prohibition time assigned to the UE. The SR collision mitigation information can indicate (b) a signal pattern assigned to the UE, and (c) a prohibition time assigned to the UE.

A method for mitigating scheduling request (SR) collisions on a PUCCH comprising:
  transmitting, by a base station, SR collision mitigation information toward user equipments (UEs);
  receiving, by the base station, one or more SR signals;
  determining, by the base station, that an SR collision has occurred; and
  resolving the SR collision based on the SR collision mitigation information.

The SR collision mitigation information can indicate (a) a resource pattern assigned to the UE, (b) a signal pattern assigned to the UE, or (c) a prohibition time assigned to the UE. The SR collision mitigation information can indicate (a) a resource pattern assigned to the UE and (b) a signal pattern assigned to the UE. The SR collision mitigation information can indicate (a) a resource pattern assigned to the UE, (b) a signal pattern assigned to the UE, and (c) a prohibition time assigned to the UE. The SR collision mitigation information can indicate (a) a resource pattern assigned to the UE and (c) a prohibition time assigned to the UE. The SR collision mitigation information can indicate (b) a signal pattern assigned to the UE, and (c) a prohibition time assigned to the UE.

The base station can be an eNodeB.

A base station comprising:
  a transceiver configured to transmit, by a base station, SR collision mitigation information toward user equipments (UEs);
  wherein the transceiver is further configured to receive one or more SR signals;
  a processor configured to determine that an SR collision has occurred and to resolve the SR collision based on the SR collision mitigation information.

The SR collision mitigation information can indicate (a) a resource pattern assigned to the UE, (b) a signal pattern assigned to the UE, or (c) a prohibition time assigned to the UE. The SR collision mitigation information can indicate (a) a resource pattern assigned to the UE and (b) a signal pattern assigned to the UE. The SR collision mitigation information can indicate (a) a resource pattern assigned to the UE, (b) a signal pattern assigned to the UE, and (c) a prohibition time assigned to the UE. The SR collision mitigation information can indicate (a) a resource pattern assigned to the UE and (c) a prohibition time assigned to the UE. The SR collision mitigation information can indicate (b) a signal pattern assigned to the UE, and (c) a prohibition time assigned to the UE.

The base station can be an eNodeB.

A method for mitigating scheduling request (SR) collisions on a PUCCH comprising:
  receiving, by the base station, one or more SR signals;
  determining, by the base station, that an SR collision has occurred;
  determining, by the base station, channel signature information associated with the one or more SR signals; and
  resolving the SR collision based on the channel signature information.

The channel signature information can be based on one or more of path-gain (or loss), Doppler shift and/or angle of arrival of the signal.

The base station can be an eNodeB.

A base station comprising:
  a transceiver configured to receive one or more SR signals;
  a processor configured to determine that an SR collision has occurred, to determine channel signature information associated with the one or more SR signals and to resolve the SR collision based on the channel signature information.

The channel signature information can be based on one or more of path-gain (or loss), Doppler shift and/or angle of arrival of the signal.

The base station can be an eNodeB.

These embodiments enable, among other things, reuse of SR transmission resources to support greater numbers of geographically proximate UEs. For example, collisions of SRs which have been transmitted by different UEs using the same SR transmission resource are reduced in the first instance and, to the extent that such collisions may still occur, they can be more readily resolved. Collision resolution may occur by, for example, using information about a UE's SR resource pattern, signal pattern, prohibition time and/or channel signature to determine which UE was likely involved in an SR signal collision.

ABBREVIATIONS

3GPP 3$^{rd}$ Generation Partnership Project
BS Base Station
BSR Buffer Status Report
eNodeB evolved Node B
LTE Long-Term Evolution
PUCCH Physical Uplink Control Channel
SC-FDMA Single Carrier Frequency Division Multiple Access
SR Scheduling Request
UE User Equipment

BRIEF DESCRIPTION OF THE DRAWINGS

The accompanying drawings illustrate exemplary embodiments, wherein.

DETAILED DESCRIPTION

The following detailed description of the example embodiments refers to the accompanying drawings. The same reference numbers in different drawings identify the same or similar elements. Also, the following detailed description does not limit the invention. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned above, it would be desirable to provide one or more mechanisms to enable the reuse of resources for transmitting scheduling requests (SRs), while also being able to identify users and resolve collisions, e.g., on the PUCCH in an LTE system. Various mechanisms are described herein including:

(a) to assign to each user i a periodicity p(i) and a sequence of resource indices; this is referred to herein as assignment of a resource pattern;

(b) to assign to each user i a periodicity p(i) and a symbol sequence; this is referred to herein as assignment of a signal pattern;

(c) to assign to each user i a prohibition time t(i), that is, if user i transmits at time t, the next time the user can transmit is at time t+t(i);

(d) for each user there can be a number of reception points (e.g., multiple antennas in the same or different eNBs) from which a predicted channel parameter or parameters (for example path gain) can be discerned for that user; this is referred to herein as the channel signature of the user.

As will be described in more detail below, each of these mechanisms can be used by themselves or in combination with one another to provide for high resource reuse and high probability of collision resolution in the context of uplink SR transmissions. Generically, one or more of these mechanisms which can be implemented as an embodiment are referred to herein as "SR collision mitigation mechanisms". In this context, note that SR collision mitigation information or mechanisms as described herein refer generally to information or mechanisms which enable the same SR transmission resources to be allocated to more than one UE in a manner which also facilitates resolving transmission collisions which occur if such UEs do, in fact, transmit SRs using the same SR transmission resource.

Figure 1:
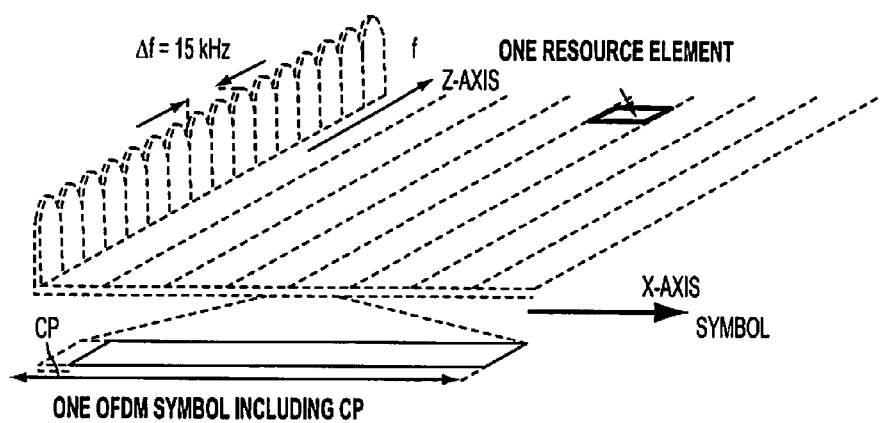
FIG. 1 is a schematic diagram illustrating the LTE time-frequency grid.
Figure 2:
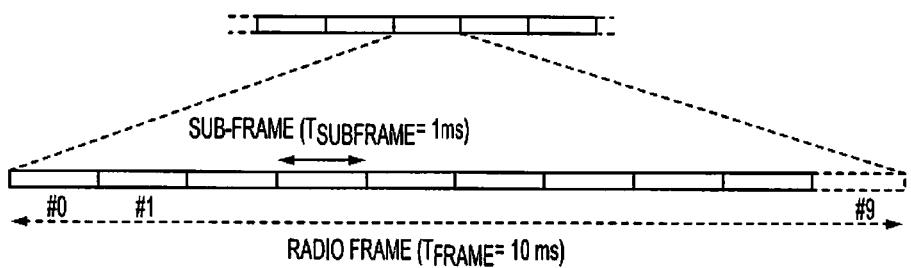
FIG. 2 is a schematic diagram illustrating the LTE downlink frame structure.
Figure 3:
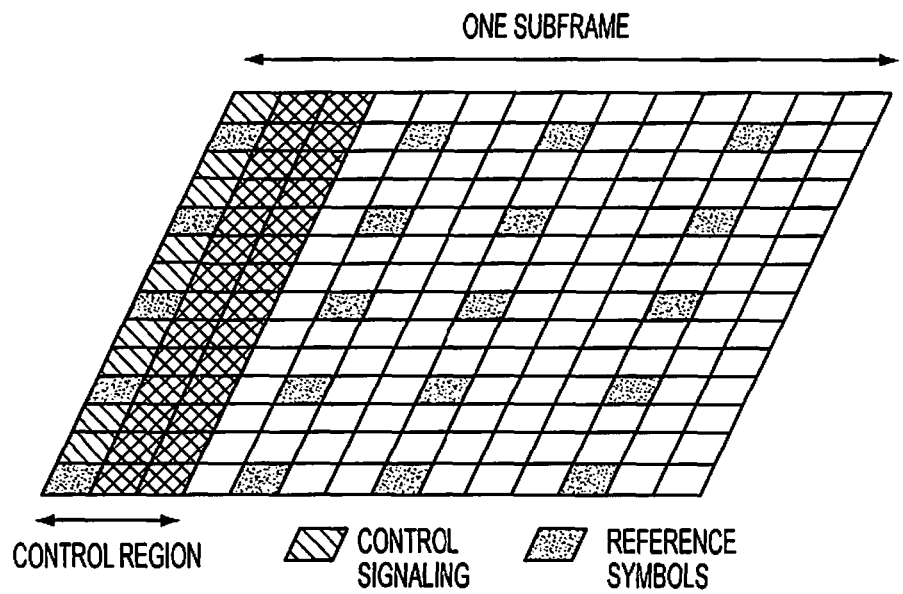
FIG. 3 is a schematic diagram illustrating an LTE downlink subframe.
Figure 4A:
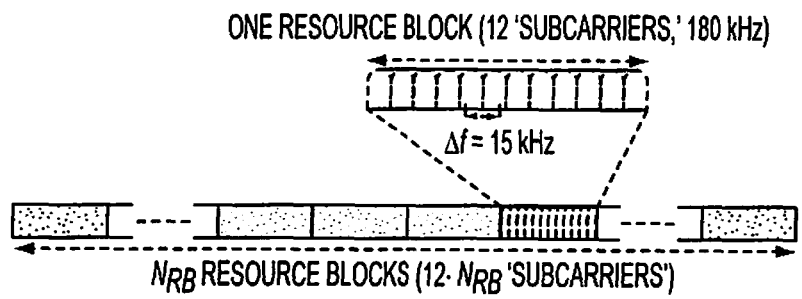
FIGS. 4(a)-4(c) are schematic diagrams illustrating various aspects of LTE uplink structure.
Figure 4B:
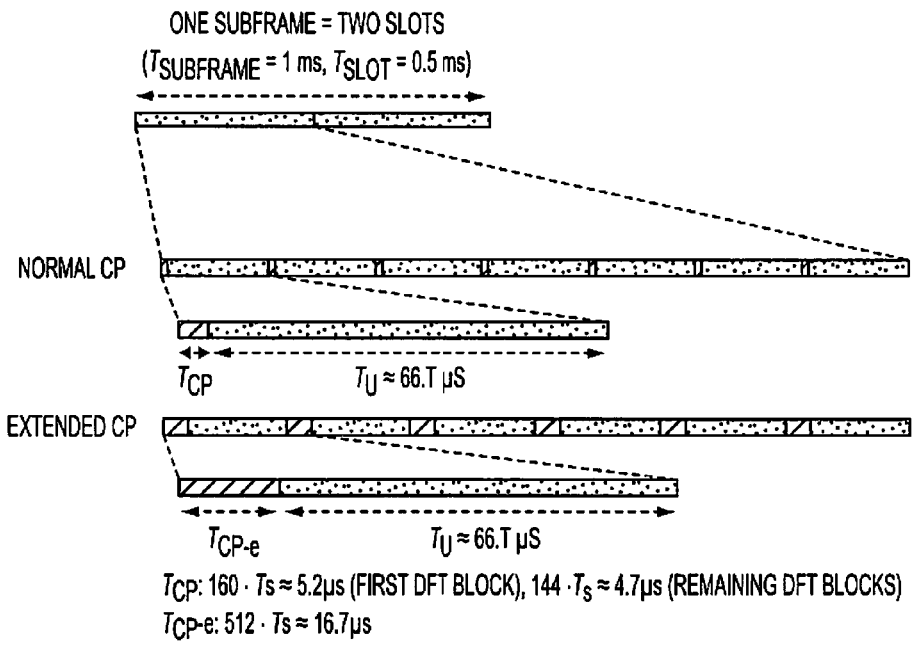
Figure 4C:
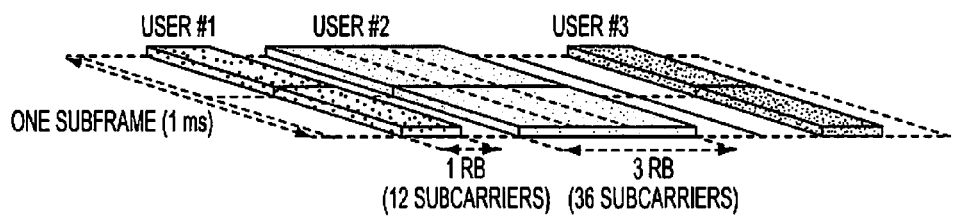
Figure 5:
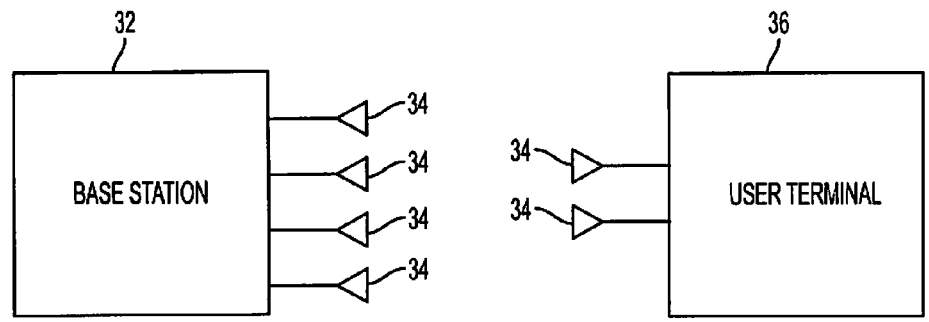
FIG. 5 is a schematic diagram illustrating a base station and mobile station.
Figure 6:
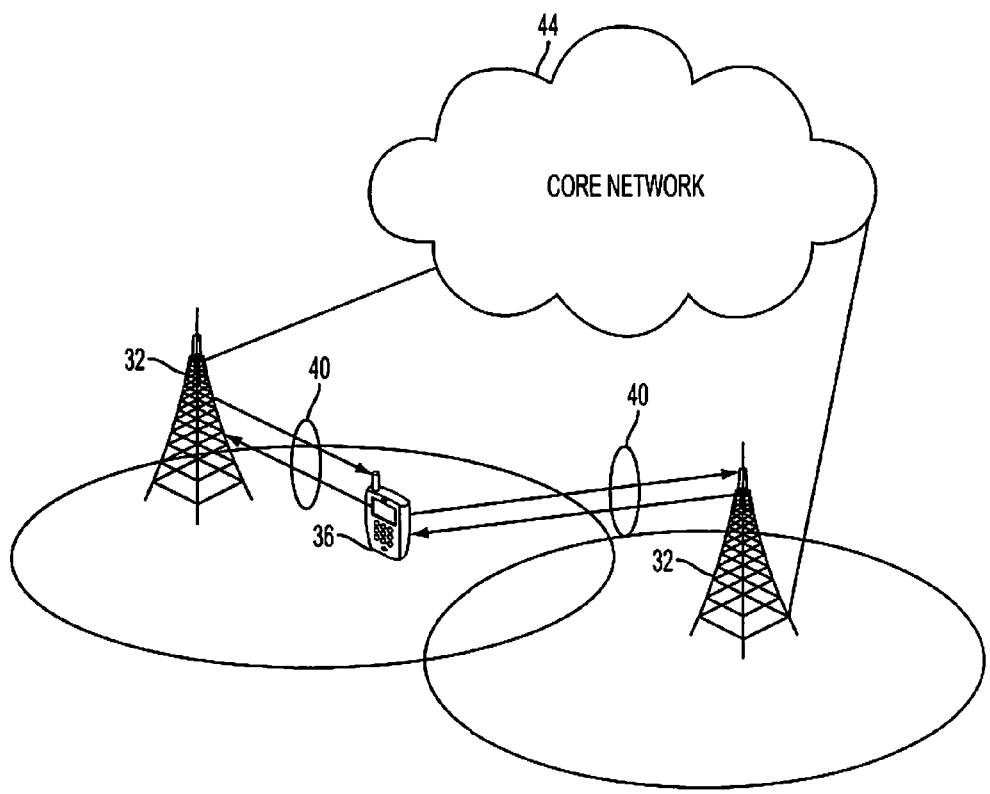
FIG. 6 is a schematic diagram showing a scenario in a radio communications network.

To provide some context for the following example embodiments related to SR collision mitigation mechanisms, consider the example radio communication system as shown from two different perspectives in FIGS. 5 and 6, respectively. To increase the transmission rate of the systems, and to provide additional diversity against fading on the radio channels, modern wireless communication systems include transceivers that use multi-antennas (often referred to as a MIMO systems). The multi-antennas may be distributed to the receiver side, to the transmitter side and/or provided at both sides as shown in FIG. 5. More specifically, FIG. 5 shows a base station 32 having four antennas 34 and a user terminal (also referred to herein as "user equipment" or "UE") 36 having two antennas 34. The number of antennas shown in FIG. 5 is an example only, and is not intended to limit the actual number of antennas used at the base station 32 or at the user terminal 36 in the example embodiments to be discussed below.

Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 6.

FIG. 6 shows, among other things, two eNodeBs 32 and one user terminal 36. The user terminal 36 uses dedicated channels 40 to communicate with the eNodeB(s) 32, e.g., by transmitting or receiving RLC PDU segments as according to example embodiments described below. The two eNodeBs 32 are connected to a Core Network 44.

Figure 7:
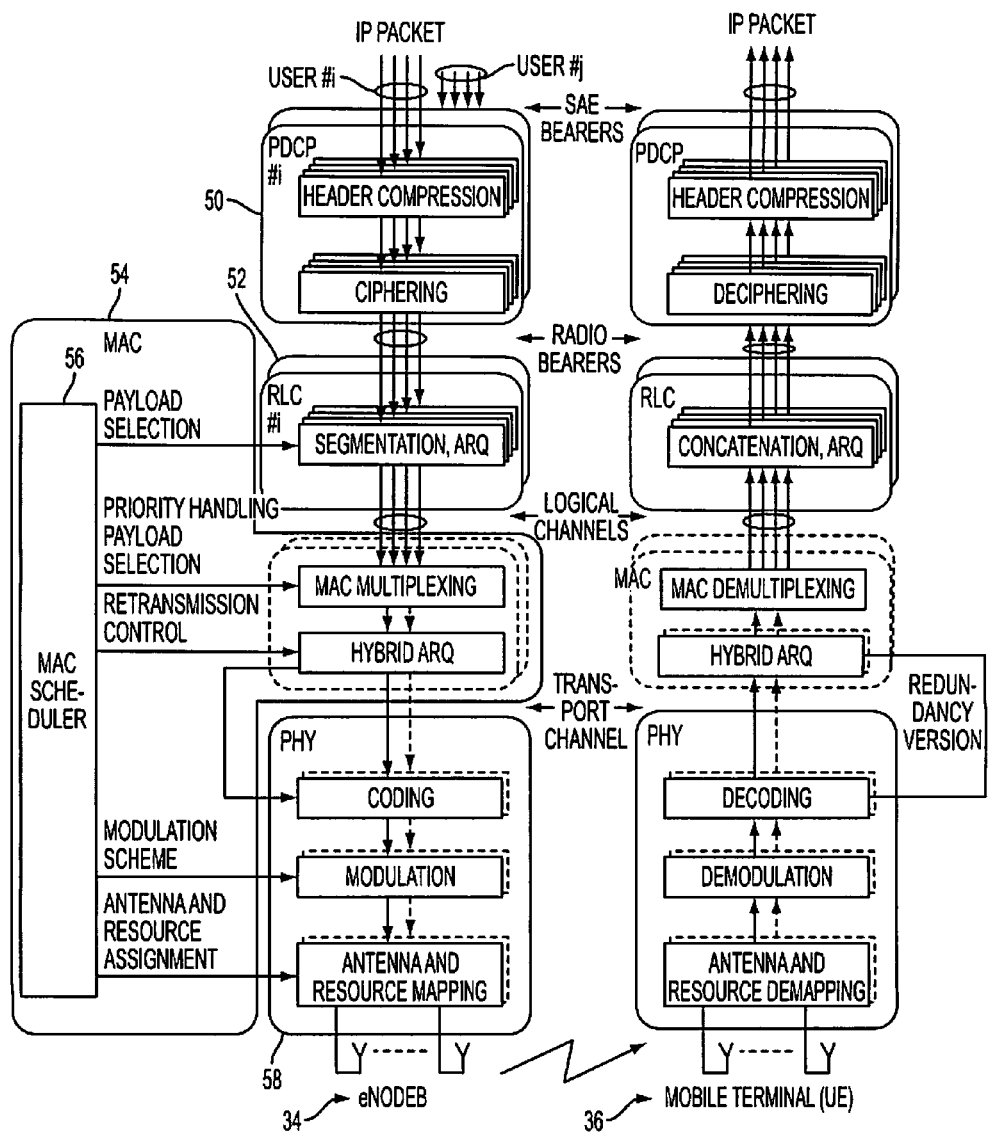
FIG. 7 is a schematic diagram illustrating processing of data packets in LTE.

One example LTE architecture for processing data for transmission by an eNodeB 32 to a UE 36 (downlink) is shown in FIG. 7. Therein, data to be transmitted by the eNodeB 32 (e.g., IP packets) to a particular user is first processed by a packet data convergence protocol (PDCP) entity 50 in which the IP headers are (optionally) compressed and ciphering of the data is performed. The radio link control (RLC) entity 52 handles, among other things, segmentation of (and/or concatenation of) the data received from the PDCP entity 50 into protocol data units (PDUs). Additionally, the RLC entity 52 optionally provides a retransmission protocol (ARQ) which monitors sequence number status reports from its counterpart RLC entity in the UE 36 to selectively retransmit POUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 7 provides outputs to, and receives inputs from, their adjacent entities by way of bearers or channels as shown. The reverse of these processes are provided for the UE 36 as shown in FIG. 7 for the received data, and the UE 36 also has similar transmit chain elements as the eNB 34 for transmitting on the uplink toward the eNB 32, as will be described in more detail below particularly with respect to neighbour cell lists, measurements and measurement patterns.

Having described some example LTE devices in which aspects of SR collision mitigation mechanisms according to example embodiments can be implemented, the discussion now returns to consideration of these collision mitigation topics. Starting first with an example of an SR collision mitigation mechanism of the type (a) described above, suppose that a system has N resources available for SR transmissions. In this context an SR transmission resource can, for example, each include a PUCCH resource index associated with both a frequency resource and a code resource, and a time offset.

Figure 8:
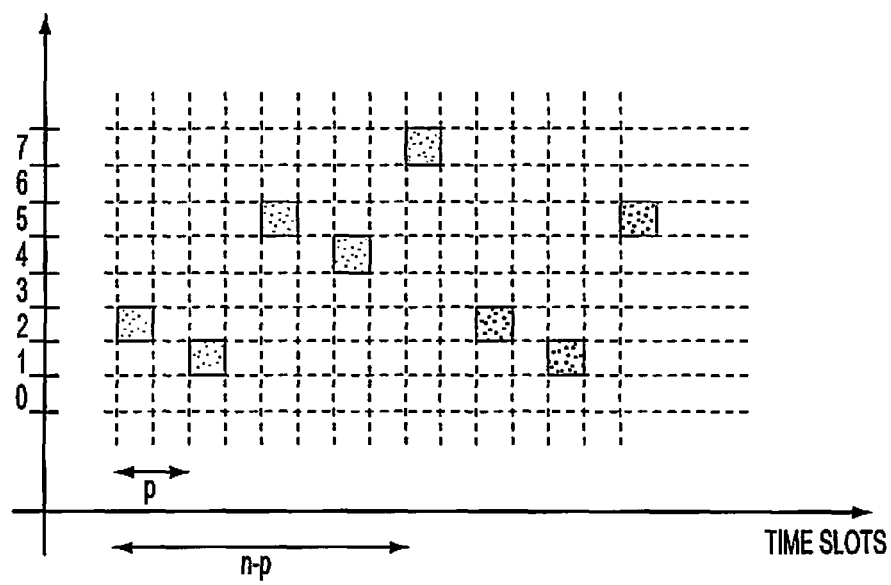
FIGS. 8-13 depict various aspects of SR collision interference according to embodiments.

For each user i a number n(i) is selected, this number represents the number of resource indices assigned to user i. The network then assigns to each user i a pattern, such that if two patterns collide at time t, it is ensured that they do not collide at time t+p(i). FIG. 8 depicts a purely illustrative example of this resource pattern embodiment wherein the pattern has parameter values of p=2, n=5 and the resource sequence is [2,1,5,4,7]. Thus, as seen in FIG. 8, the UE which has been assigned this exemplary resource pattern could transmit an SR signal in every other time slot using a specified (and revolving) resource identified by a respective one of the indices 2, 1, 5, 4, 7, 2, 1, 5 . . . .

Figure 9:
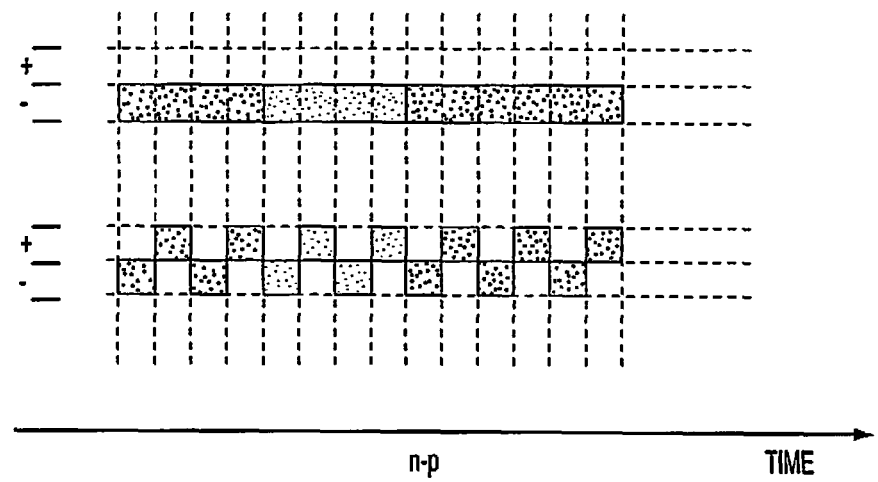

Considering next an example of an SR collision mitigation mechanism of the type (b) described above, i.e., associated with using a signal pattern, suppose that signals transmitted in the exemplary radio communication system use BPSK modulation, then a signal pattern would be represented as a bit sequence (alternatively QPSK modulation would be represented by two bits per symbol). For two users, the system or network can assign the symbol patterns 0000 and 0101. FIG. 9 illustrates these exemplary signal patterns associated with the two users according to this embodiment. Note that in this example a pair of consecutive signals is orthogonal.

Figure 10:
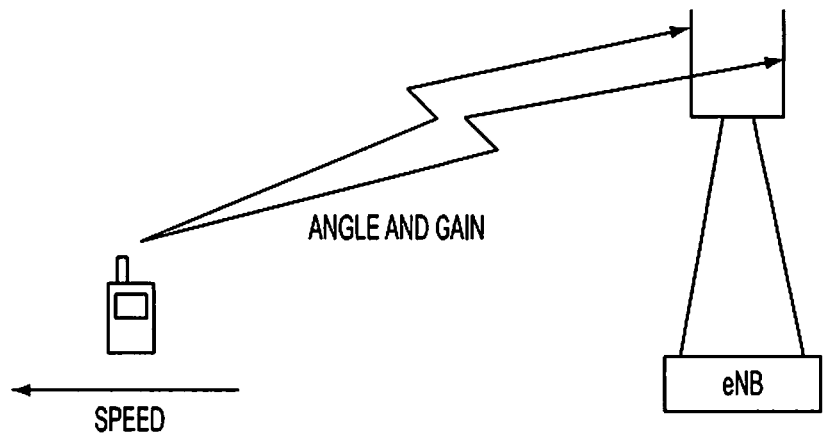

Considering next an example of an SR collision mitigation mechanism of the type (d) described above, i.e., associated with channel signatures, a baseline implementation of a channel or signal signature should be possible to implement on a single eNB. Here, the concept is to use rich channel data for each UE as part of the identification and collision resolution process, see e.g., FIG. 10. Therein, an eNB equipped with multiple antennas can use measurements from the different antennas to estimate path-gain, Doppler shift and/or angle of arrival of the signal. This data can then be used to identify users by matching the measures to historic data for the candidate UEs, i.e., those UEs in proximity to the eNB which may have transmitted SRs that have collided with one another on the uplink by virtue of their being transmitted, e.g., using the same SR transmission resource.

Figure 11:
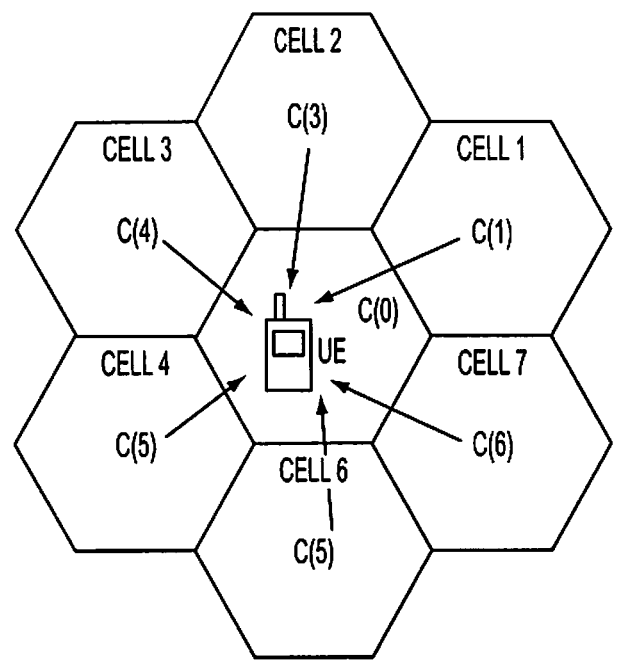

Using multiple eNBs, a more advanced solution can be provided as, for example shown in FIG. 11. As illustrated therein, the system can use the channel measurements, e.g., path-gain, Doppler shift and/or angle of arrival of the signal, of the signal received by one or more of the serving cell and neighboring cells to aid in resolving SR collisions. For example, we can let the three eNBs with the highest path gain define the channel signature; in this example we could use [C(0), C(1), C(5)] as a signal pattern for the UE in the picture (0 being the serving cell).

Having described some of the exemplary SR collision mitigation mechanisms described herein, consider now some exemplary usages thereof. Suppose that at time t a transmission is detected by the system on resource index i with a received signal S in the serving cell and E(i) to the neighboring cells. Let D(i,t) be the collection of channel signatures of users that can use resource i at time t. ML-decoding can then be used on S and E(i) to identify the user transmitting on the resource using the collection D(i,j) as candidates. After decoding, the system can conclude that it is likely that a collision has occurred between the SR transmissions from two (or more) UEs. Depending on, for example load, the system can either avoid scheduling a user, or do a ML-decoding for a combination of users and, for example, schedule the two users that have a combined channel signature best corresponding to the received signal.

If a collision has occurred (or if the system doesn't decode the user identity), the system can resolve the collision in the next TTI with a transmission. The system can, for example, accomplish this by using the combined information from the signals received in the two TTIs using ML-decoding. If good resource patterns are used, e.g., as described above with respect to category (a), the users colliding in the first TTI will not collide in the next TTI. If good signal patterns are used, e.g., as described above with respect to category (b), then the signals spanning over, for example, two TTI s with collisions will be orthogonal. Even better separation between users or higher reuse can be achieved by assigning both signal and resource patterns to the users for their transmission of SR signals on the PUCCH. For resource patterns the system can use both time and index separation to make sure that there are never two consecutive collisions, see, e.g., FIG. 8 for a time separation example.

Suppose that there are three categories of users which are given different periodicities for SR transmission. Suppose further that the network assigns p(1)=2, p(2)=3 and p(3)=5 to the three categories of users. Then, if there is a collision between two users there will be no collision between the same two users in the next three TTIs with transmissions even if a fixed resource index is used. Clearly the worst case is a collision between users 1 and 2, see e.g., FIG. 12.

Figure 12:
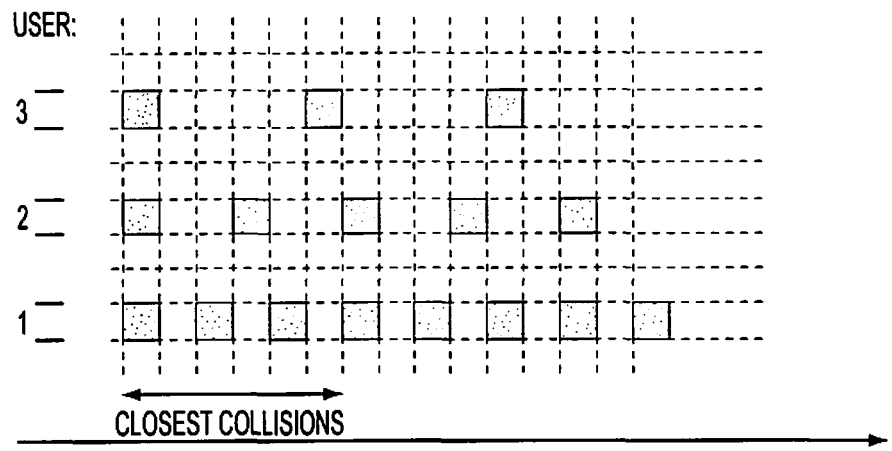
Figure 13:
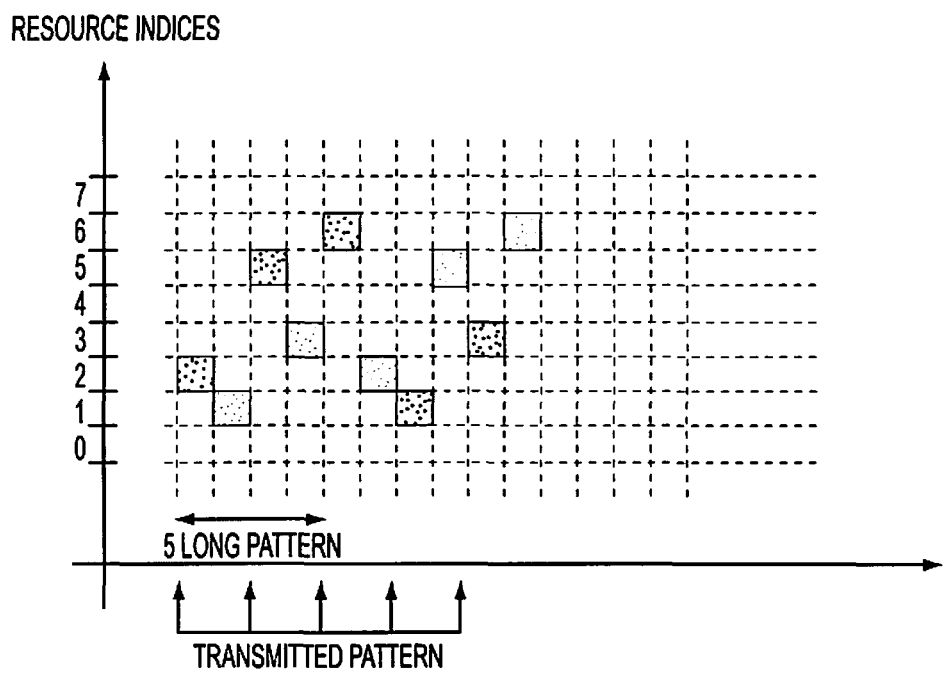

Consider next an SR collision mitigation mechanism of type (c), i.e., including a time prohibition feature. Suppose, for example, that there are three categories of users given the same periodicities for SR transmission, but different prohibition times. Suppose further that the system assigns $p(1)=p(2)=p(3)=1$ and $t(1)=2$, $t(2)=3$ and $t(3)=5$. If there is a collision between two users there will be no collision between the same two users in the next three TTIs with transmissions even if a fixed resource index is used. Thus, the situation is the same in the previous example, as illustrated in FIG. 12. Observe, however, that if the system assigns prohibition times which are relatively prime to the resource pattern lengths all information will be used in the resource pattern. See FIG. 13 for an example with prohibition time 2 and resource pattern length 5.

Note that all of the embodiments described herein which rely on separation in time, resource and/or signal pattern are described on subframe basis (TTI) but may also be applied on slot basis, where one subframe consists of two consecutive slots.

The above described schemes provide the possibility to detect the unique identity of the user transmitting an SR signal, but some ambiguity still exists, especially before the completion of the entire pattern sequence. In these cases the eNB may elect to schedule one or a subset of the possible users. When selecting the subset to schedule factors such as probability from detection sequence, predictions of traffic and user quality of service requirements may be taken into account. For example if we have a user with very delay sensitive data with a high priority quality of service class given an SR period of 1 ms sharing this resource with a lower priority user with an SR period of 5 ms the scheduler may first try to schedule the high priority user, before waiting for the next SR instance to uniquely identify the user.

The foregoing embodiments provide, for example, an advantage of high reuse; SR signal collisions can be resolved with high probability and very short UE waiting periods for an SR resource can be achieved. Meaning that systems and methods according to these embodiments can, for example, without any extra resource blocks used for SR go from 10 ms periodicity to 1 ms periodicity. Moreover, by operating in this way, the expected latency for requesting UL resources can be lowered from, e.g., 6 ms to about 2.5 ms.

Also it should be noted that even with high transmission resource reuse the risk of SR collision can be kept low. For example, suppose that a system assigns patterns in 10 by 10 blocks, that each such block is assigned to 100 users, and that the system randomly picks patterns for the users. Further suppose that the probability that a user wants to use one resource is 10% uniformly over this block. Then the expected number of collisions is less than 0.47 and, if good patterns are selected, then this expected number of collisions would be even less.

Figure 14:
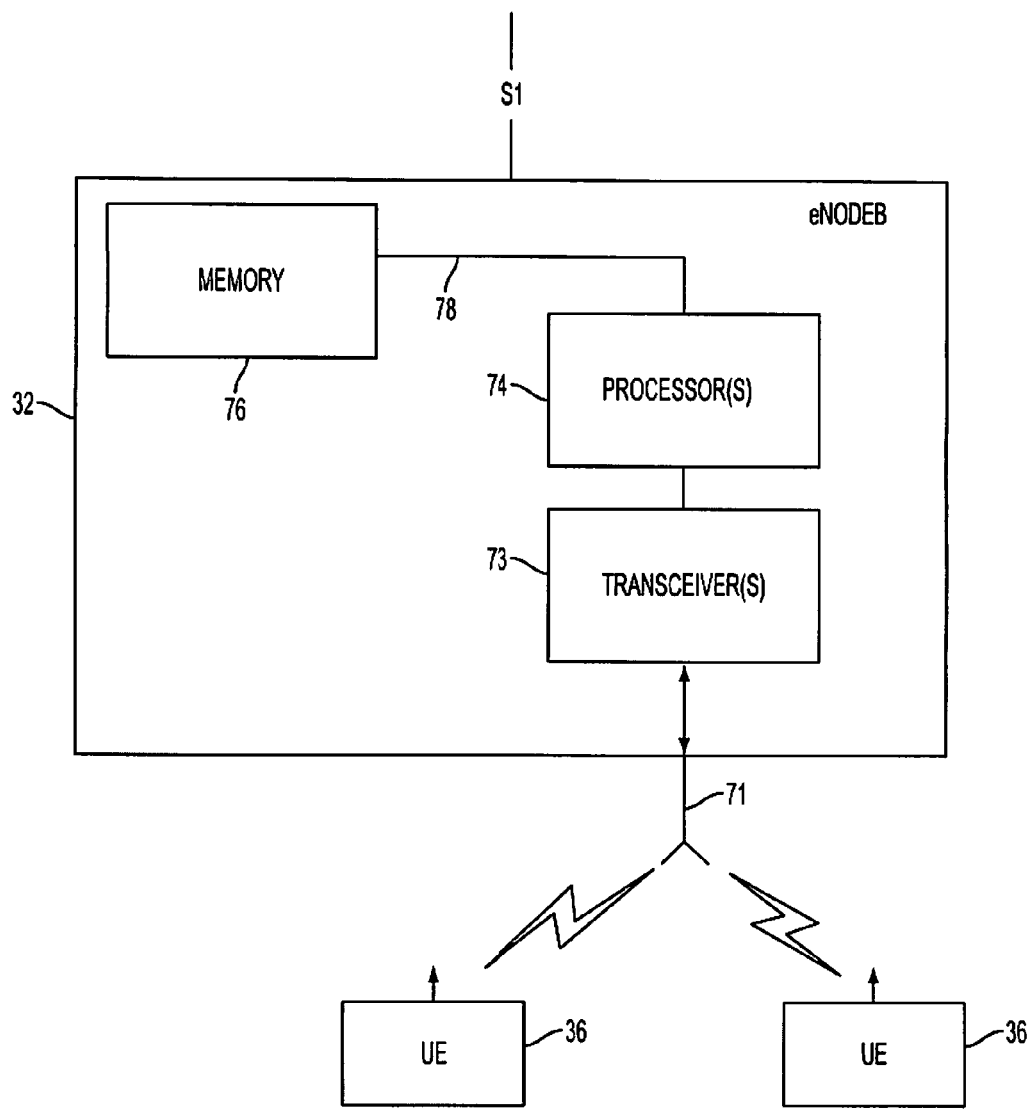
FIG. 14 illustrates embodiments of a base station (or other node).

An example base station 32, e.g., an eNodeB, which is configured to interact with a UE as described above to mitigate SR collision impacts is generically illustrated in FIG. 14. Therein, the eNodeB 32 includes one or more antennas 71 connected to processor(s) 74 via transceiver(s) 73. The processor 74 is configured to analyze and process signals received over an air interface via the antennas 71, as well as those signals received from core network node (e.g., access gateway) via, e.g., an interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 72 and processor(s) 74 to process uplink and downlink signals. A similar, generic structure, e.g., including a memory device, processor(s) and a transceiver, can be used (among other things) to implement communication nodes such as UEs 36 to receive signals and process those signals in the manner described above. Likewise the elements shown in block 32 could also represent a network node, albeit without the provision of an air interface transceiver.

The above-described example embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method in a user equipment (UE) for transmitting a scheduling request (SR) on a physical uplink control channel (PUCCH) comprising:
    receiving SR collision mitigation information; and
    transmitting an SR signal on said PUCCH using an SR transmission resource of a plurality of SR transmission resources in a time interval that is selected based on the SR collision mitigation information, the SR collision mitigation information including one of a resource pattern and signal pattern, defined by a sequence of the plurality of SR transmission resources, during the time interval, that is assigned to the UE to facilitate resolution of an SR collision on the SR transmission resource.

2. The method of claim 1, wherein the resource pattern includes a periodicity at which the UE is to transmit the SR signal and the sequence is a resource index sequence of the plurality of SR transmission resources on which the UE is to transmit the SR signal.

3. The method of claim 1, wherein the signal pattern includes a periodicity at which the UE is to transmit the SR signal and the sequence is a symbol sequence which the UE is to include in the SR signal.

4. The method of claim 1, wherein the SR collision mitigation information includes a prohibition time assigned to the UE, wherein after said UE transmits said SR signal, said UE waits for said prohibition time to transmit said SR signal again.

5. The method of claim 1, wherein the SR signal includes a single bit of information indicating to a base station that a buffer status report (BSR) has been triggered in the UE.

6. The method of claim 2, wherein said plurality of SR transmission resources each include a PUCCH resource index associated with both a frequency resource and a code resource, and a time offset.

7. The method of claim 3, wherein said symbol sequence is based, at least in part, on a type of modulation used to transmit the SR signal.

8. The method of claim 1, further comprising:
    if no acknowledgement of the SR signal is received, then re-transmitting said SR signal in accordance with the SR collision mitigation information.

9. The method of claim 8, wherein the resource pattern includes a periodicity at which the UE is to transmit the SR signal and the sequence is a resource index sequence of the plurality of SR transmission resources on which the UE is to transmit the SR signal; and the method further comprising re-transmitting the SR signal based on the periodicity and using a next SR transmission resource in the sequence.

10. The method of claim 8, wherein the SR collision mitigation information includes a prohibition time assigned to the UE, wherein said UE re-transmits said SR signal after waiting for said prohibition time to elapse.

11. A user equipment (UE) comprising:
a transceiver configured to:
receive scheduling request (SR) collision mitigation information; and
transmit an SR signal on a physical uplink control channel (PUCCH) using an SR transmission resource of a plurality of SR transmission resources in a time interval that is selected based on the SR collision mitigation information, the SR collision mitigation information including one of a resource pattern and signal pattern, defined by a sequence of the plurality of SR transmission resources, during the time interval, that is assigned to the UE to facilitate resolution of an SR collision on the SR transmission resource.

12. The UE of claim 11, wherein the resource pattern includes a periodicity at which the UE is to transmit the SR signal and the sequence is a resource index sequence of the plurality of SR transmission resources on which the UE is to transmit the SR signal.

13. The UE of claim 11, wherein the signal pattern includes a periodicity at which the UE is to transmit the SR signal and the sequence is a symbol sequence which the UE is to include in the SR signal.

14. The UE of claim 11, wherein the SR collision mitigation information includes a prohibition time assigned to the UE, wherein after said UE transmits said SR signal, said UE must then wait for said prohibition time to transmit said SR signal again.

15. The UE of claim 11, wherein the SR signal includes a single bit of information indicating to a base station that a buffer status report (BSR) has been triggered in the UE.

16. The UE of claim 11, wherein said plurality of SR transmission resources each include a PUCCH resource index associated with a frequency resource and a code resource, and a time offset.

17. The UE of claim 13, wherein said symbol sequence is based, at least in part, on a type of modulation used to transmit the SR signal.

18. The UE of claim 11, wherein the transceiver is further configured to:
if no acknowledgement of the SR signal is received, then re-transmit said SR signal in accordance with the SR collision mitigation information.

19. The UE of claim 18, wherein the resource pattern includes a periodicity at which the UE is to transmit the SR signal and the sequence is a resource index sequence of the plurality of SR transmission resources on which the UE is to transmit the SR signal; and
the transceiver further configured to re-transmit the SR signal based on the periodicity and using a next SR transmission resource in the sequence.

20. The UE of claim 18, wherein the SR collision mitigation information includes a prohibition time assigned to the UE, wherein said transceiver is further configured to re-transmit said SR signal after waiting for said prohibition time to elapse.

21. A method in a base station for mitigating scheduling request (SR) collisions on a physical uplink control channel (PUCCH) comprising:
transmitting SR collision mitigation information toward user equipments (UEs);
receiving at least one SR signal;
determining that an SR collision has occurred; and
resolving the SR collision based on the SR collision mitigation information, the SR collision mitigation information including one of a resource pattern and signal pattern, defined by a sequence of a plurality of UE uplink transmission resources, during a time interval, that is assigned to the UE.

22. The method of claim 21, wherein the resolving further comprises:
identifying, based on the SR collision mitigation information, at least one UE which was likely to have transmitted an SR signal involved in said SR collision; and
granting at least one UE uplink transmission resource of the plurality of UE uplink transmission resources in response to the identifying.

23. The method of claim 21, wherein the resource pattern includes a periodicity at which the UE is to transmit the SR signal and the sequence is a resource index sequence of the plurality of UE uplink transmission resources on which the UE is to transmit the SR signal.

24. The method of claim 21, wherein the signal pattern includes a periodicity at which the UE is to transmit the SR signal and the sequence is a symbol sequence which the UE is to include in the SR signal.

25. The method of claim 21, wherein the SR collision mitigation information includes a prohibition time assigned to the UE, wherein after said UE transmits said SR signal, said UE waits for said prohibition time to transmit said SR signal again.

26. The method of claim 21, wherein the resolving further comprises:
estimating, by the base station, at least one of path-gain, Doppler shift and angle of arrival of the at least one SR signal; and
identifying users associated with the SR collision by comparing the estimated at least one of path-gain, Doppler shift and angle of arrival to historic data for candidate UEs.

27. The method of claim 26, further comprising:
receiving estimates of the at least one of one of path-gain, Doppler shift and angle of arrival of the at least one SR signal; and
using the received estimates in the identifying step.

28. The method of claim 21, wherein the at least one SR signal includes a single bit of information indicating to the base station that a buffer status report (BSR) has been triggered in a corresponding UE.

29. A base station comprising:
a transceiver configured to:
transmit, by a base station, scheduling request (SR) collision mitigation information toward user equipments (UEs);
receive at least one SR signal; and
a processor configured to:
determine that an SR collision has occurred; and
resolve the SR collision based on the SR collision mitigation information, the SR collision mitigation information including one of a resource pattern and signal pattern, defined by a sequence of a plurality of UE uplink transmission resources, during a time interval, that is assigned the UE.

30. The base station of claim 29, wherein the processor is further configured to resolve the SR collision by:
   identifying, based on the SR collision mitigation information, at least one UE which was likely to have transmitted an SR signal involved in said SR collision; and
   granting at least one UE uplink transmission resource of the plurality of UE uplink transmission resources.

31. The base station of claim 29, wherein the resource pattern includes a periodicity at which the UE is to transmit the SR signal and the sequence is a resource index sequence of the plurality of UE uplink transmission resources on which the UE is to transmit the SR signal.

32. The base station of claim 29, wherein the signal pattern includes a periodicity at which the UE is to transmit the SR signal and the sequence is symbol sequence which the UE is to include in the SR signal.

33. The base station of claim 29, wherein the SR collision mitigation information includes a prohibition time assigned to the UE, wherein after said UE transmits said SR signal, said UE waits for said prohibition time to transmit said SR signal again.

34. The base station of claim 29, wherein the processor is further configured to:
   resolve the SR collision by estimating, by the base station, at least one of path-gain, Doppler shift and angle of arrival of the one or more SR signals; and
   identify users associated with the SR collision by comparing the estimated at least one of path-gain, Doppler shift and angle of arrival to historic data for candidate UEs.

35. The base station of claim 34, further comprising an interface configured to receive estimates of the at least one of one of path-gain, Doppler shift and angle of arrival of the at least one SR signal from other base stations; and
   the processor is further configured to identify the users using the received estimates.

36. The base station of claim 29, wherein the at least one SR signal includes a single bit of information indicating to the base station that a buffer status report (BSR) has been triggered in a corresponding UE.

* * * * *